(12) United States Patent
Busser et al.

(10) Patent No.: US 11,882,448 B2
(45) Date of Patent: Jan. 23, 2024

(54) SYSTEM AND METHOD FOR PACKET DETAIL DETECTION AND PRECISION BLOCKING

(71) Applicant: SR Technologies, Inc., Sunrise, FL (US)

(72) Inventors: Ryan Busser, Fort Lauderdale, FL (US); Olivia Turner, Pompano Beach, FL (US); Graham K. Smith, Boca Raton, FL (US)

(73) Assignee: SR Technologies, Inc., Sunrise, FL (US)

( * ) Notice: Subject to any disclaimer, the term of this patent is extended or adjusted under 35 U.S.C. 154(b) by 0 days.

(21) Appl. No.: 17/717,511

(22) Filed: Apr. 11, 2022

(65) Prior Publication Data

US 2022/0394475 A1 Dec. 8, 2022

Related U.S. Application Data

(60) Provisional application No. 63/197,767, filed on Jun. 7, 2021.

(51) Int. Cl.
*H04W 12/088* (2021.01)
*H04W 28/02* (2009.01)

(52) U.S. Cl.
CPC ..... *H04W 12/088* (2021.01); *H04W 28/0252* (2013.01)

(58) Field of Classification Search
CPC ........................ H04W 12/088; H04W 28/0252
(Continued)

(56) References Cited

U.S. PATENT DOCUMENTS 7,791,637 B2 * 9/2010 Nanba ................... H04L 1/0002
348/14.02
8,520,516 B2 * 8/2013 Ohnishi ................ H04L 47/135
370/230.1
(Continued)

FOREIGN PATENT DOCUMENTS

CN 107634959 A * 1/2018
CN 108377234 A * 8/2018 ........... G02B 13/003
(Continued)

OTHER PUBLICATIONS

He et al. ("Precise Packet Loss Pattern Generation by Intentional Interference", IEEE, 2011 (Year: 2011).*

*Primary Examiner* — Michael W Chao
*Assistant Examiner* — Peiliang Pan
(74) *Attorney, Agent, or Firm* — Christopher & Weisberg, P.A.

(57) ABSTRACT

A method implemented in a monitoring station is described. The monitoring station is configurable to monitor a communication between a first wireless device and a second wireless device. The method includes receiving a packet from the first wireless device, the packet being addressed to the second wireless device and determining whether the received packet meets at least one criterion of one packet that is to be blocked. The method further includes transmitting a blocking signal when the received packet meets the at least one criterion of the one packet that is to be blocked. The blocking signal causes an interference with a reception, at the second wireless device, of at least one field of the received packet.

20 Claims, 12 Drawing Sheets

(58) Field of Classification Search
USPC .......................................................... 726/13
See application file for complete search history.

(56) References Cited

U.S. PATENT DOCUMENTS

| | | | | |
|---|---|---|---|---|
| 8,875,276 | B2* | 10/2014 | Cullimore | H04L 63/0227 726/13 |
| 8,910,241 | B2* | 12/2014 | Pollutro | G06F 21/6218 726/13 |
| 8,966,607 | B2* | 2/2015 | Sauter | H04L 63/0236 726/13 |
| 9,370,013 | B2* | 6/2016 | Murakami | H04B 5/00 |
| 9,674,142 | B2* | 6/2017 | Park | H04L 63/02 |
| 9,819,441 | B2* | 11/2017 | Immendorf | H04K 3/226 |
| 10,097,578 | B2* | 10/2018 | Baldonado | H04L 63/1425 |
| 10,608,777 | B2* | 3/2020 | Ju | H04W 12/121 |
| 10,972,432 | B2* | 4/2021 | Lee | H04L 63/0236 |
| 10,998,716 | B2* | 5/2021 | Gao | H02H 7/268 |
| 11,690,109 | B2* | 6/2023 | Deng | H04W 76/14 370/254 |
| 2013/0103827 | A1* | 4/2013 | Dunlap | H04L 41/0893 709/224 |
| 2014/0283004 | A1* | 9/2014 | Moore | H04L 63/0254 726/13 |
| 2015/0020188 | A1* | 1/2015 | Segal | H04L 63/0245 726/13 |
| 2015/0096010 | A1* | 4/2015 | Pollutro | G06F 21/335 726/13 |
| 2015/0128246 | A1* | 5/2015 | Feghali | H04L 63/0209 726/13 |
| 2015/0237060 | A1* | 8/2015 | Wease | H04L 63/1416 726/13 |
| 2015/0358287 | A1* | 12/2015 | Caputo, II | H04L 63/1425 726/13 |
| 2016/0094516 | A1* | 3/2016 | Zuk | H04L 63/0227 726/13 |
| 2016/0337219 | A1* | 11/2016 | Smith | H04L 1/16 |
| 2021/0013986 | A1* | 1/2021 | Shaham | H04K 3/42 |
| 2022/0086581 | A1* | 3/2022 | Sridharan | H04S 3/008 |
| 2023/0199839 | A1* | 6/2023 | Yerramalli | H04W 74/0808 370/329 |

FOREIGN PATENT DOCUMENTS

| | | | | |
|---|---|---|---|---|
| CN | 107634959 B | * | 7/2020 | |
| CN | 114691448 A | * | 7/2022 | |
| CN | 113164969 B | * | 9/2022 | ......... B02C 18/0092 |
| WO | WO-2017073089 A1 | * | 5/2017 | ............. H04L 12/66 |

* cited by examiner

SYSTEM AND METHOD FOR PACKET DETAIL DETECTION AND PRECISION BLOCKING

CROSS-REFERENCE TO RELATED APPLICATION

This application is related to and claims priority to U.S. Provisional Patent Application Ser. No. 63/197,767, filed Jun. 7, 2021, entitled SYSTEM AND METHOD FOR PACKET DETAIL DETECTION AND PRECISION BLOCKING, the entirety of which is incorporated herein by reference.

TECHNICAL FIELD

The present disclosure relates to wireless communications and in particular to a method and monitoring station for identifying and/or interrupting specific packets being communicated to or from a target wireless device or devices.

BACKGROUND

The present disclosure relates to communication between devices are based upon the IEEE 802.11 technology commonly known as Wi-Fi. IEEE Standard 802.11-2020 ("Standard") is used as the reference for the specifications used in this disclosure. The general exchange of packets between two stations (STAs), such as between a STA A and STA B is for STA A to transmit a packet to STA B and then wait for the acknowledgment (ACK) packet to be received back from STA B before sending the next packet. In an infrastructure network, either STA A or STA B may be an access point (AP). After the STA has transmitted the packet to an AP, the STA will wait for a set timeout period that is dependent upon the channel frequency band and the physical data rate. If the ACK is not received within that timeout period, the AP will assume that the packet failed. In the general case, if successive transmissions of that packet do not receive an ACK within the specified timeout period, then the AP will retry the packet up to a retry limit and at that point discard the packet.

In certain circumstances, it may be desired to interrupt communications to or from a STA or AP. A general term for this interruption of communication is "denial of service (DoS)". Many DoS methods are known, but in the general sense they can block communications for the entire infrastructure network rather than only the communications to and from one particular STA. In many circumstances, DoS methods may also block communications in other nearby networks. Also, because the entire infrastructure network communications may be affected, the devices in the network, and/or the user of the network may be aware that the network is compromised or under attack. Not all DoS actions are nefarious. For example, a DoS action may be a legally approved action, such as blocking video/data from a video camera/doorbell when a warrant is being served.

FIG. 1 is a diagram that shows the format of an IEEE 802.11 direct sequence spread spectrum, DSSS, (Clause 15 devices in the Standard) or high rate DSSS, HR/DSSS, (Clause 16 devices in the Standard) transmitted packet at 2.4 GHz. The preamble 101 includes of a synchronization field 103 followed by the Start Frame Delineator (SFD) 104. The preamble 101 is followed by the header 102 which includes the signal 105, service 106, and length 107 fields followed by a cyclic redundancy check (CRC) 108. After the CRC 108 comes the media access control (MAC) header 110 and frame body 109. At the end of the packet, the frame check sum (FCS) 140 is used to determine if the packet has been received with no errors. The MAC header 110 may consist of the following fields: frame control 111, duration/ID 112, Address 1 113, Address 2 114, Address 3 115, sequence control 116, address 4 117, quality of service (QoS) control 118, and HT control 119. The frame control field 111 consists of the following subfields: protocol version 120, type 121, subtype 122, to DS 123, from DS 124, more fragments 125, retry 126, power management 127, more data 128, protected frame 129, and order 130. Each of these fields/subfields and their use is described in the Standard.

FIG. 2 is a diagram that shows the typical format of an IEEE 802.11 OFDM transmitted packet for Clause 17, 18, 19 and 21 devices of the IEEE 802.11 Standard which are commonly known as 11a, 11g, 11n, and 11ac respectively. The preamble 201 is followed by the signal field 210 which is a single symbol. After the signal field 210 comes the service 202 and MAC header 110 fields, followed by the frame body 109 and FCS 140. After the FCS 140, a tail 204 and pad 205 may be present. The signal field 210 consists of the following subfields: rate 211, reserved 212, length 213, parity 214, and tail 215. Each of these fields/subfields and their use is described in the Standard.

SUMMARY

Some embodiments advantageously provide a method, apparatus, and system for packet detail detection and/or precision blocking.

According to one aspect, a method implemented in a monitoring station configurable to monitor a communication between a first wireless device and a second wireless device is described. The method includes receiving a packet from the first wireless device, the packet being addressed to the second wireless device; determining whether the received packet meets at least one criterion of one packet that is to be blocked; and transmitting a blocking signal when the received packet meets the at least one criterion of the one packet that is to be blocked. The blocking signal causes an interference with a reception, at the second wireless device, of at least one field of the received packet.

In some embodiments, determining whether the received packet meets the at least one criterion of one packet that is to be blocked includes determining whether at least one of a subfield and a field of the received packet matches at least one of one corresponding subfield and one corresponding field of the one packet that is to be blocked, the at least one field up to and including a MAC header.

In some other embodiments, the at least one of the subfield and the field of the received packet includes a value associated with any of a first address, a second address, a type, subtype, length, rate, and a signal.

In one embodiment, the method further includes determining a duration of the received packet based at least in part on the at least one of the subfield and the field of the received packet.

In another embodiment, at least one of the blocking signal is transmitted after a reception of a MAC header of the received packet, and the transmission of the blocking signal is terminated before an end of the received packet.

In some embodiments, the method further includes transmitting, to the first wireless device, an acknowledgement packet associated with the received packet at a time after at least one of the end of the received packet and the termination of the transmission of the blocking signal.

In some other embodiments, the acknowledgement packet is transmitted at a time corresponding to a Short Interframe Space after a determined end of a duration of the received packet.

In one embodiment, the method further includes determining an attribute of the received packet at least in part on at least one of a type and a subtype subfield of a frame control field of the received packet.

In another embodiment, the at least one criterion is met when the determined attribute indicates any one of the received packet is a data packet, and the data packet includes data associated with at least one of video and audio.

In some embodiments, the first wireless device is a first station (e.g., an STA 305), and the second wireless device is a second station (e.g., another STA 305, an AP 301). The first and second stations are configured to communicate with each other using at least one packet that is compliant with Institute of Electrical and Electronics Engineers Standard 802.11.

According to another aspect, a monitoring station configurable to monitor a communication between a first wireless device and a second wireless device is described. The monitoring station includes a transceiver (e.g., a RF front end and/or a wireless receiver and/or a wireless transmitter) configured to: receive a packet from the first wireless device, the packet being addressed to the second wireless device; and transmit a blocking signal when the received packet meets at least one criterion of one packet that is to be blocked. The blocking signal causes an interference with a reception, at the second wireless device, of at least one field of the received packet. The monitoring station further includes processing circuitry in communication with the transceiver. The processing circuitry is configured to determine whether the received packet meets the at least one criterion of the one packet that is to be blocked.

In some embodiments, determining whether the received packet meets the at least one criterion of one packet that is to be blocked includes determining whether at least one of a subfield and a field of the received packet matches at least one of one corresponding subfield and one corresponding field of the one packet that is to be blocked, the at least one field up to and including a MAC header.

In some other embodiments, the at least one of the subfield and the field of the received packet includes a value associated with any of a first address, a second address, a type, subtype, length, rate, and a signal.

In one embodiment, the processing circuitry is further configured to determine a duration of the received packet based at least in part on the at least one of the subfield and the field of the received packet.

In another embodiment, at least one of the blocking signal is transmitted after a reception of a MAC header of the received packet, and the transmission of the blocking signal is terminated before an end of the received packet.

In some embodiments, the transceiver is further configured to transmit, to the first wireless device, an acknowledgement packet associated with the received packet at a time after at least one of the end of the received packet and the termination of the transmission of the blocking signal.

In some other embodiments, the acknowledgement packet is transmitted at a time corresponding to a Short Interframe Space after a determined end of a duration of the received packet.

In one embodiment, the processing circuitry is further configured to determine an attribute of the received packet at least in part on at least one of a type and a subtype subfield of a frame control field of the received packet.

In another embodiment, the at least one criterion is met when the determined attribute indicates any one of the received packet is a data packet, and the data packet includes data associated with at least one of video and audio According to one aspect, a monitoring system configurable to monitor a communication between a first wireless device and a second wireless device is described. The monitoring system includes a transceiver configured to receive a packet from the first wireless device, the packet being addressed to the second wireless device; and transmit a blocking signal when the received packet meets at least one criterion of one packet that is to be blocked. The blocking signal causes an interference with a reception, at the second wireless device, of at least one field of the received packet. The transceiver is further configured to transmit, to the first wireless device, an acknowledgement packet associated with the received packet at a time after at least one of an end of the received packet and a termination of the transmission of the blocking signal. The monitoring system further includes processing circuitry in communication with the transceiver, where the processing circuitry is configured to determine an attribute of the received packet at least in part on at least one of a type and a subtype subfield of a frame control field of the received packet; and determine whether the received packet meets the at least one criterion of the one packet that is to be blocked, the at least one criterion being met when the determined attribute indicates the received packet is a data packet.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

This disclosure describes methods, apparatuses and systems for packet detail detection and precision blocking for devices, e.g., for wireless devices based upon the IEEE 802.11 technology, commonly known as Wi-Fi. In one embodiment of this disclosure, packets may be exchanged between wireless devices, e.g., AP, STA, etc. In a nonlimiting example, packets may be exchanged between an access point AP 301 (i.e., a first wireless device) and a target STA 305 (i.e., a second wireless device), in an infrastructure network. In another embodiment of this disclosure, packets are exchanged between STAs that are in direct association, e.g., "Wi-Fi Direct". A monitoring station 310 is one that may generally comply with the 802.11 Standard but has been modified, as described in this disclosure, e.g., so as to monitor transmitted packets from any Wi-Fi AP or STA and transmit at precise times. Although the embodiments disclosed herein relate to Wi-Fi communications, the disclosure is not limited to only Wi-Fi communications, and may be applied to other types of communications between wireless devices.

Figure 3:
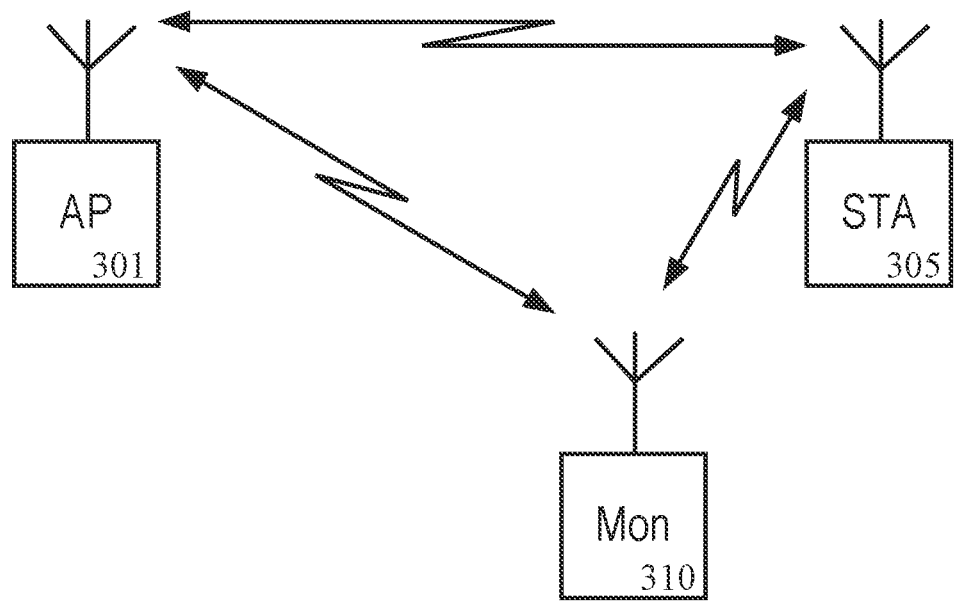
FIG. 3 is an example schematic diagram depicting a communications link between an AP and a STA in an example IEEE 802.11 infrastructure network according to the principles of the present disclosure.

Referring again to the drawing figures in which like reference designators refer to like elements, FIG. 3 is an example schematic diagram depicting a communications link between an AP 301 and a STA 305 in an example IEEE 802.11 infrastructure network. A monitoring station 310 may be present which is positioned such that it can receive packets being transmitted between the AP 301 and the STA 305. The monitoring station 310 may also transmit packets to the AP 301 and/or the STA 305. In one example, the monitoring station 310 may constantly transmit one type of packet or a variety of packets to the AP 301 in order to deny service to the AP 301 and the STA 305. Such a DoS attack could, however, deny service to the entire infrastructure network of STAs associated to AP 301. In addition, any other nearby networks on the same or adjacent channels may also suffer. In another example of a DoS attack, monitoring station 310 may transmit packets to the STA 305 using the address of the AP 301 causing, for example, the STA 305 to de-authenticate or disassociate from the network. Such DoS methods are known. In the general case, however, with such DoS attacks, the AP 301 may identify that there is an attack and take appropriate action, such as ignore certain packets, and/or change channel, and/or inform the user that an attack is taking place, or, indeed, it may be obvious to the user that a DoS attack or interference is taking place.

Figure 4:
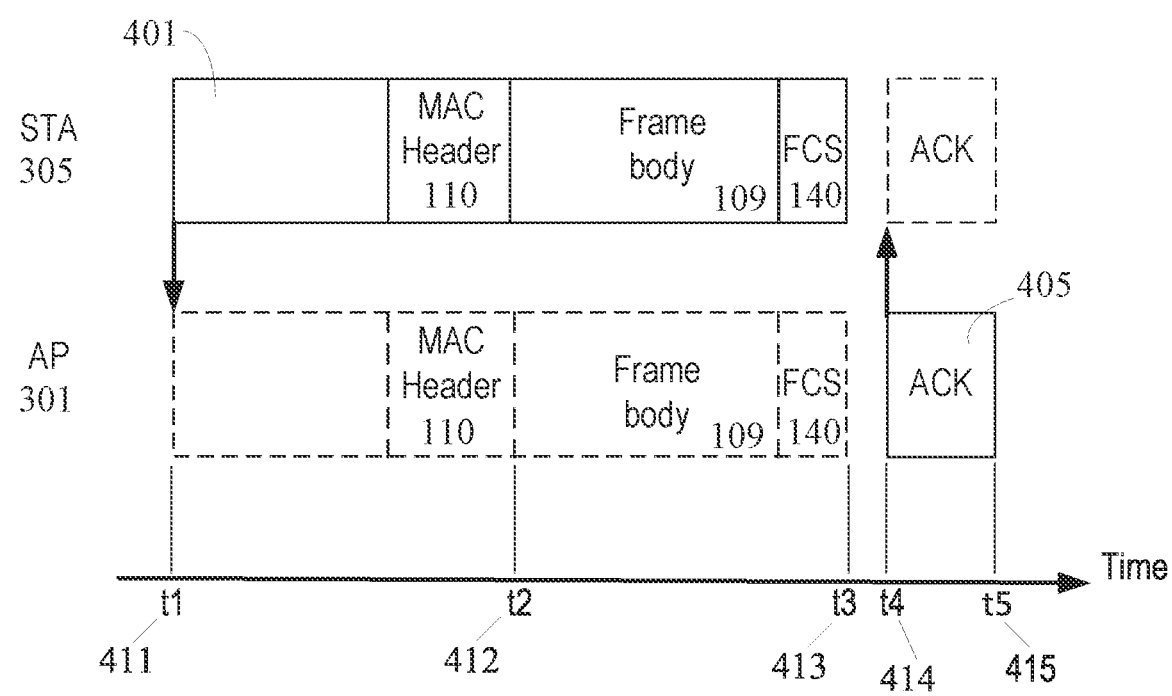
FIG. 4 is an example of a schematic timing diagram of a packet that is transmitted from STA to AP according to the principles of the present disclosure.

FIG. 4 is an example of a schematic timing diagram of a packet 401 that is transmitted from STA 305 to AP 301. At time t1 411, STA 305 starts to transmit packet 401. Packet 401 is addressed to AP 301, i.e., address 1 113 is the address of the AP and address 2 114 is the address of the STA 305. At time t2 412, AP 301 has received the MAC Header 110. At this time, AP 301 knows details of the packet including the packet duration (from either length 107, or rate 211 and length 213), the type of packet (packet type 121 and subtype 122), the sender (address 1 113), and the intended receiver (address 2 114). Based upon these details, AP 301 may determine that this packet is intended for itself and continues to receive the frame body 109 and FCS 140. At time t3, the packet 401 has been received in its entirety by AP 301. Assuming that the FCS check is successful, at time t4 414, AP 301 may send an ACK 405 transmission to STA 305. Time t4 414 is nominally at a time equal to the short interframe space SIFS, after time t3 413, where the SIFS time is defined in the Standard. At time t5 415, STA 305 has received the ACK 405 transmission, and STA 305 will not transmit a retry packet.

Figure 5:
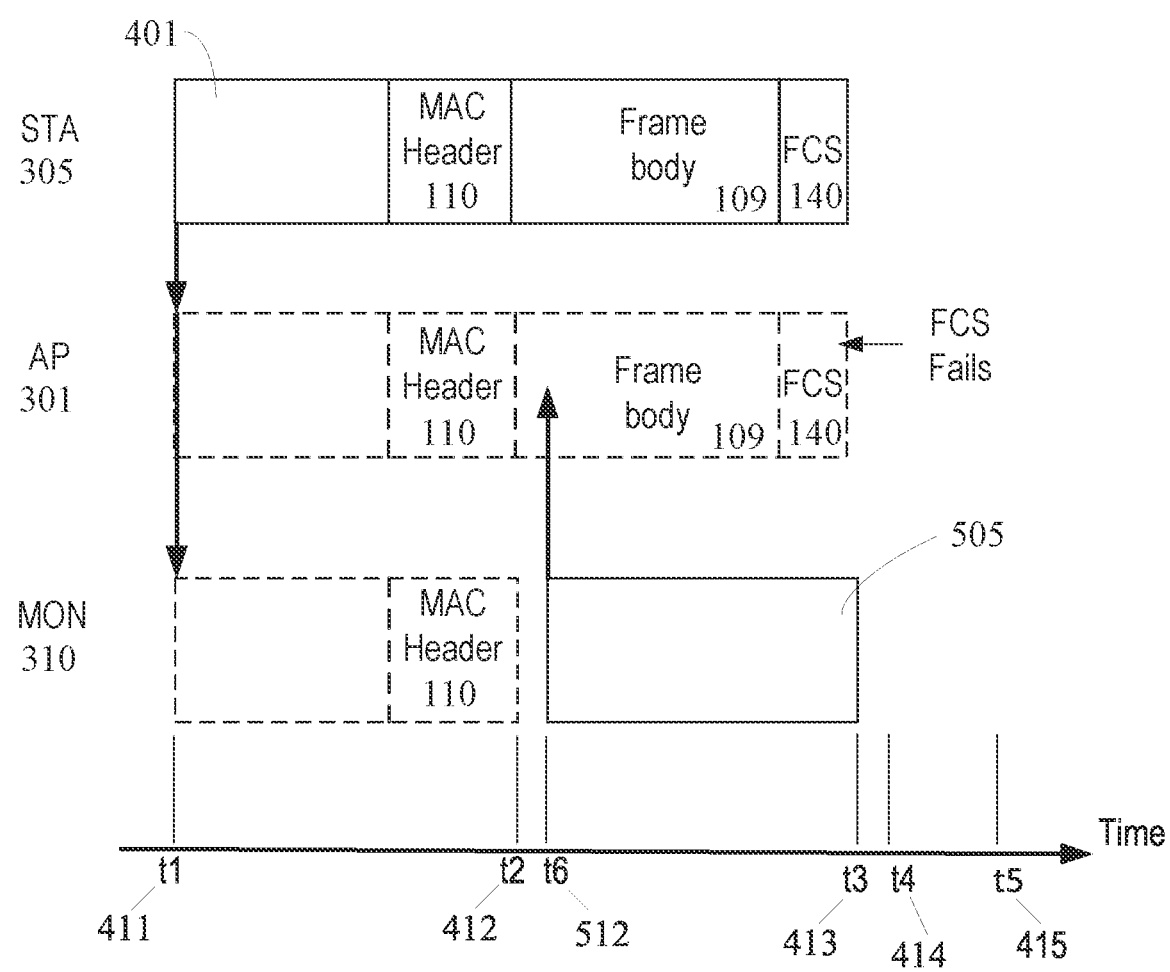
FIG. 5 is an example of a schematic timing diagram of a packet that is transmitted from STA to AP but where the monitoring station also receives the packet and transmits in order to block the reception of the packet at the AP according to the principles of the present disclosure.

FIG. 5 is an example of a schematic timing diagram of a packet 401 that is transmitted from STA 305 to AP 301 but where the monitoring station 310 also receives the packet 401 and transmits in order to block the reception of the packet 401 at AP 301. As described above with reference to FIG. 4, at time t1 411, STA 305 starts to transmit packet 401 and at time t2 412, AP 301 and monitoring station 310 have received the MAC Header 110. At this time, AP 301 and monitoring station 310 know the details of the packet including the packet duration (from either length 107, or rate 211 and length 213), the type of packet (packet type 121 and subtype 122), the sender (address 1 113), and the intended receiver (address 2 114). Based upon these details, AP 301 determines that this packet is intended for itself and continues to receive the frame body 109 and FCS 140. Monitoring station 310 may examine the packet 401 details and/or make a decision whether to block this particular packet 401. For example, based upon packet 401 being a data packet addressed to AP 301, monitoring station 310 may decide to block the packet. Monitoring station 310 may then determine the packet length (from either length 107, or rate 211 and length 213) and, at time t6 512, start to a transmission 505 such that the reception of the frame body 109 at AP 301 is subjected to interference, causing bit errors and causing the FCS 140 to fail at STA 305. Based upon the determined packet length/duration and the time between times t2 412 and t6 512, at a time before time t5 415, monitoring station 310 may cease transmission 505. The structure of the transmission 505 may, for example, be a sequence of bits, or simply noise (random bits). In some embodiments, the content of transmission 505 is not of importance, its function is simply to interfere with the reception of the frame body 109 and/or possibly the FCS 140 at AP 301 of packet 401 such that the FCS check fails. Assuming that the FSC check does fail, then AP 301 will not transmit an ACK (i.e., ACK 405) and STA 305 may subsequently send retries.

Figure 6:
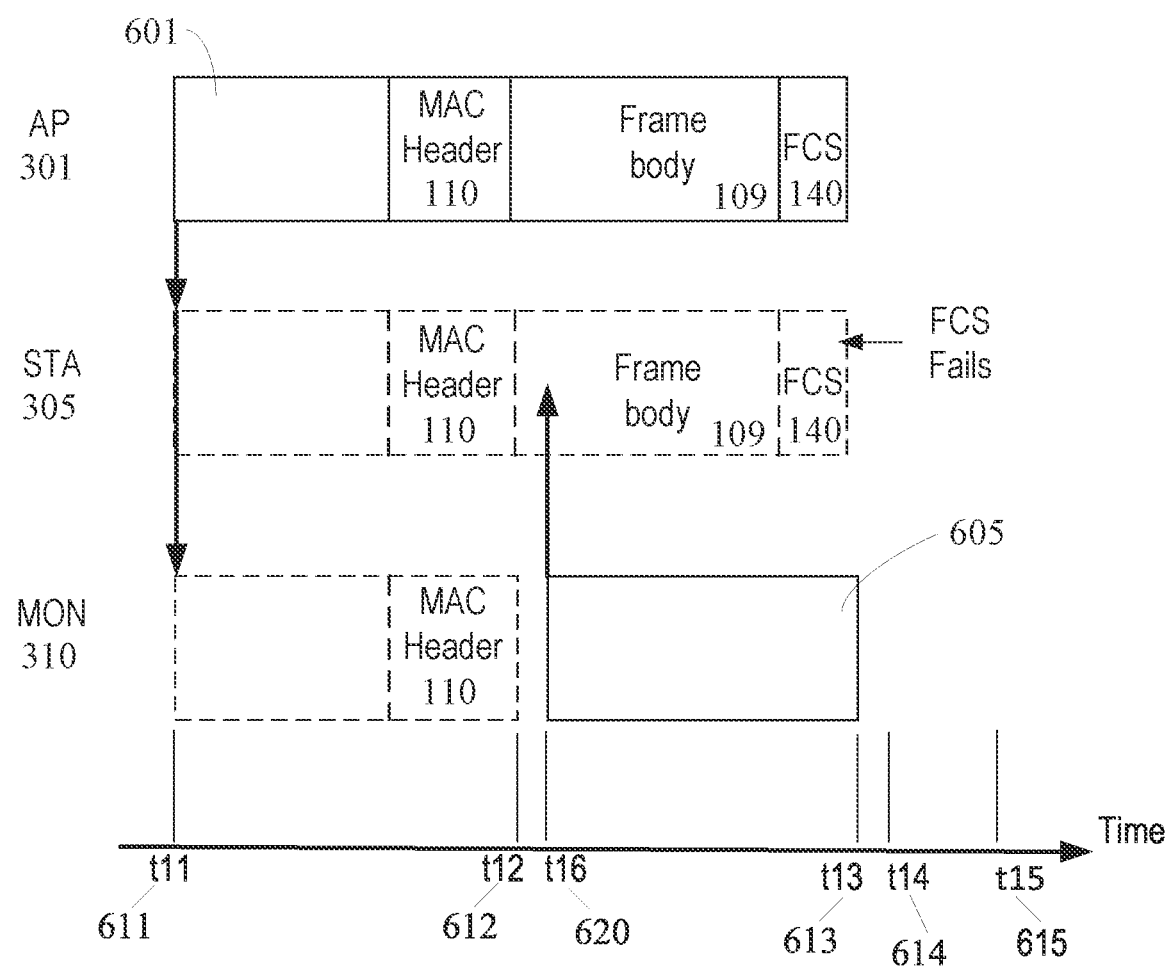
FIG. 6 is an example of a schematic timing diagram of a packet that is transmitted from AP to STA but where the monitoring station also receives the packet and transmits in order to block the reception of the packet at the STA according to the principles of the present disclosure.

FIG. 6 is an example of a schematic timing diagram of a packet 601 that is transmitted from AP 301 to STA 305, but where the monitoring station 310 also receives the packet 601 and transmits in order to block the reception of packet 601 at STA 305. FIG. 6 is similar to FIG. 5, but where a packet is transmitted by AP 301 to STA 305. At time t11 611, AP 301 starts to transmit packet 601 and at time t12 612, STA 305 and monitoring station 310 have received the MAC Header 110. At this time, STA 305 and monitoring station 310 know the details of the packet. Based upon these details, STA 305 determines that this packet is intended for itself and continues to receive the frame body 109 and FCS 140. Monitoring station 310 may examine the packet 601 details and/or make a decision whether to block this particular packet 601. Assuming that monitoring station 310 decides to block packet 601, monitoring station 310 may then determine the packet length/duration (from either length 107, or rate 211 and length 213) and at time t16 620 start transmission 605 such that the reception of the frame body 109 at STA 305 is subjected to interference causing bit errors and causing the FCS 140 to fail. Based upon the determined packet length/duration and the time between times t12 612 and t16 620, at a time before time t15 615, monitoring station 310 may cease transmission 605. Time t14 614 is a period of SIFS after t13 613 and t15 615 is the time that an ACK, if transmitted, would end. The structure of the transmission 605 may be a sequence of bits, or noise (random bits). In some embodiments, the content of transmission 605 is not of importance, it is simply used to interfere at STA 305 with the reception of the frame body 109 and/or possibly the FCS 140 of packet 601 such that the FCS check fails at time t13 613. Assuming that the FSC check does fail, then STA 305 will not transmit an ACK at time t14 614 and AP 301 may subsequently send retries.

Figure 7:
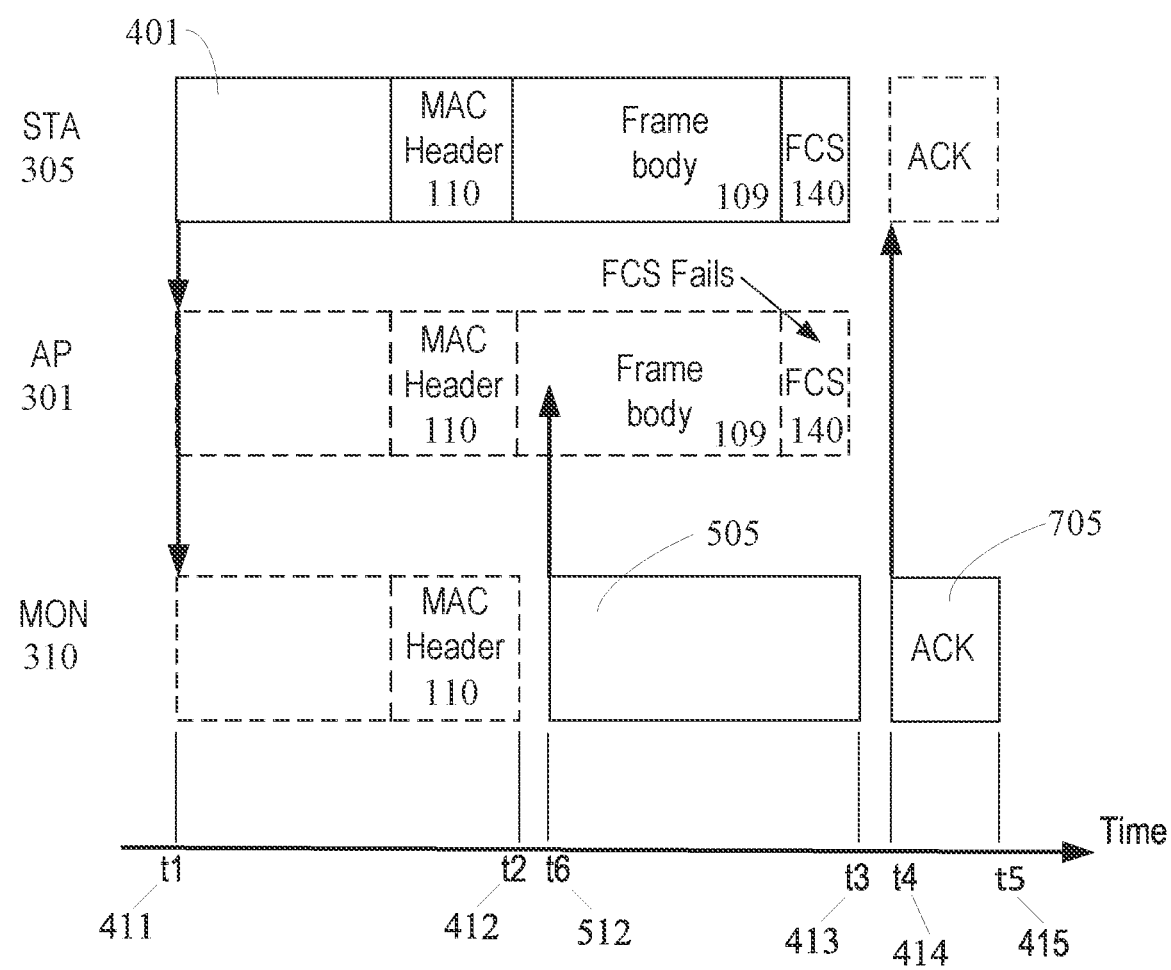
FIG. 7 is an example of a schematic timing diagram of a packet that is transmitted from STA to AP, the monitoring station also receives the packet, transmits in order to block the reception of the packet at the AP and transmits an ACK according to the principles of the present disclosure.

FIG. 7 is another example of a schematic timing diagram of a packet 401 that is transmitted from STA 305 to AP 301, the monitoring station 310 also receives the packet 401, transmits in order to block the reception of packet 401 at AP 301 but then monitoring station 310 transmits an ACK 705. FIG. 7 is identical to FIG. 5 with the addition that at time t4 414, the monitoring station 310 transmits an ACK 705, addressed to the STA 305. In this case, STA 305 at time t5 415 receives the ACK 705, assumes that AP 301 received the packet 401 correctly, and therefore does not schedule and/or transmit any retries. Transmission 505 may terminate before or at time t3 413 such that the SIFS time (t3 413 to t4 414) is clear of transmissions and STA 305 receives ACK 705 without any interference.

Figure 8:
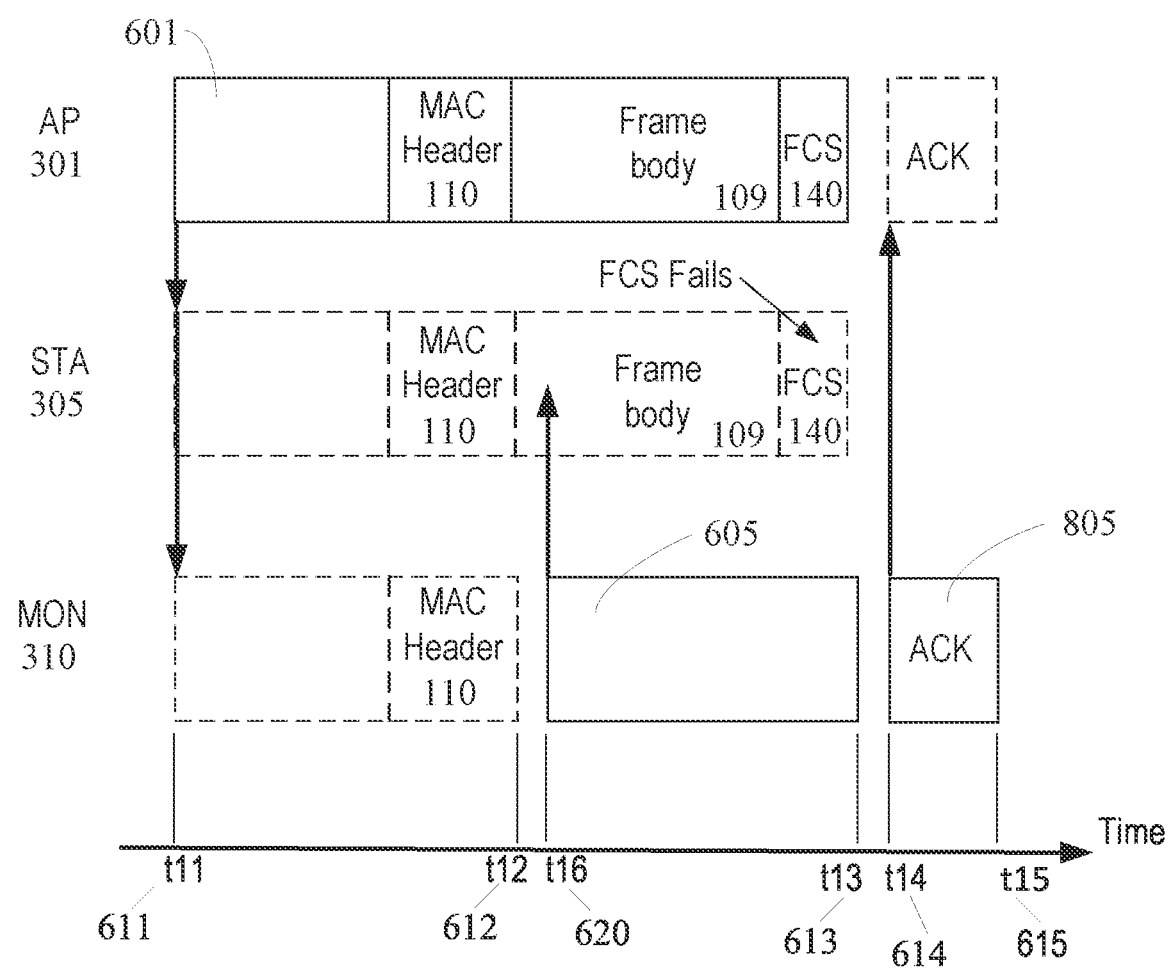
FIG. 8 is an example of a schematic timing diagram of a packet that is transmitted from AP to STA, the monitoring station also receives the packet, transmits in order to block the reception of packet at STA and transmits an ACK according to the principles of the present disclosure.

FIG. 8 is yet another example of a schematic timing diagram of a packet 601 that is transmitted from AP 301 to STA 305, the monitoring station 310 also receives the packet 601, transmits in order to block the reception of packet 601 at STA 305 and then transmits an ACK 805. FIG. 8 is identical to FIG. 6 with the addition that at time t14 614, the monitoring station 310 transmits an ACK 805, addressed to the AP 301. Hence, AP 301 receives the ACK 805 and may assume that STA 305 received packet 601 correctly, and therefore does not schedule or transmit any retries. Transmission 605 may terminate at or before time t13 613 such that the SIFS time (t13 613 to t14 614) is clear of transmissions and AP 301 can received ACK 805 without any interference.

Figure 1:
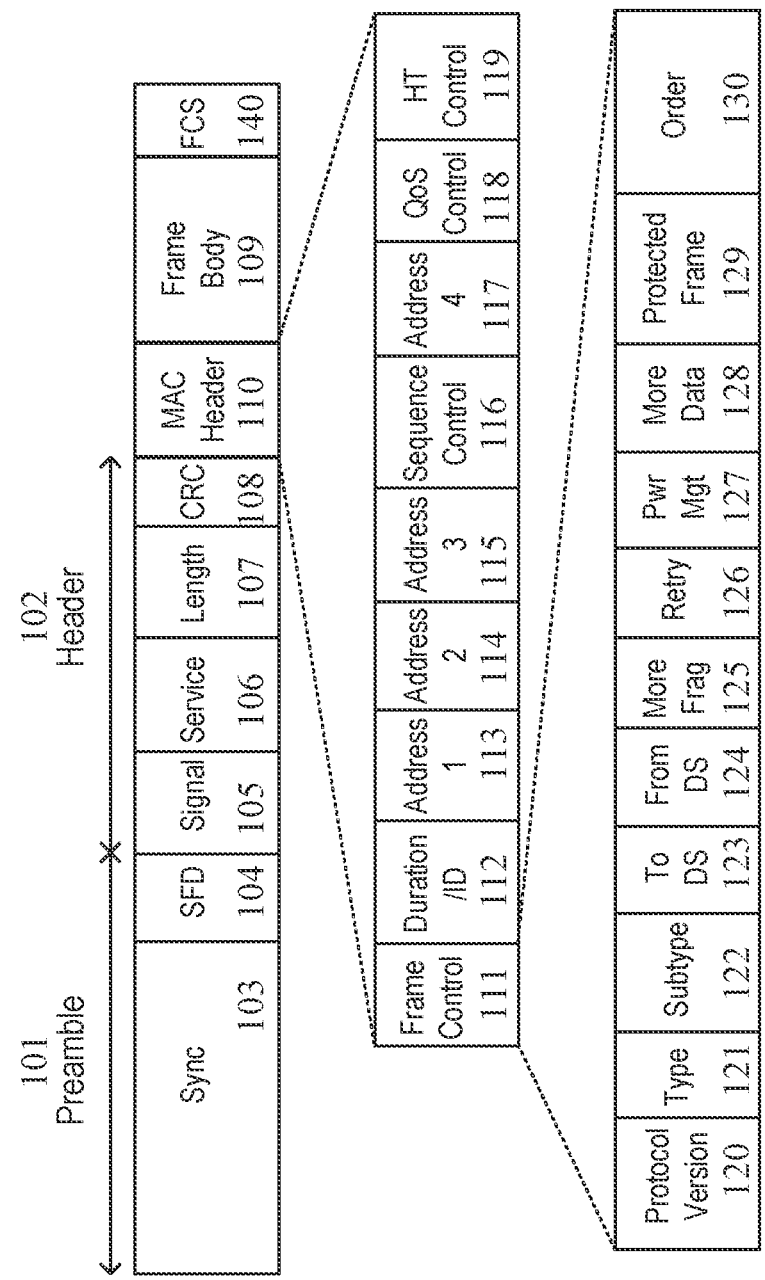
FIG. 1 is a diagram that shows the format of an 802.11 direct sequence spread spectrum, DSSS, (Clause 15 devices in the Standard) or high rate DSSS, HR/DSSS, (Clause 16 devices in the Standard) transmitted packet at 2.4 GHz.
Figure 2:
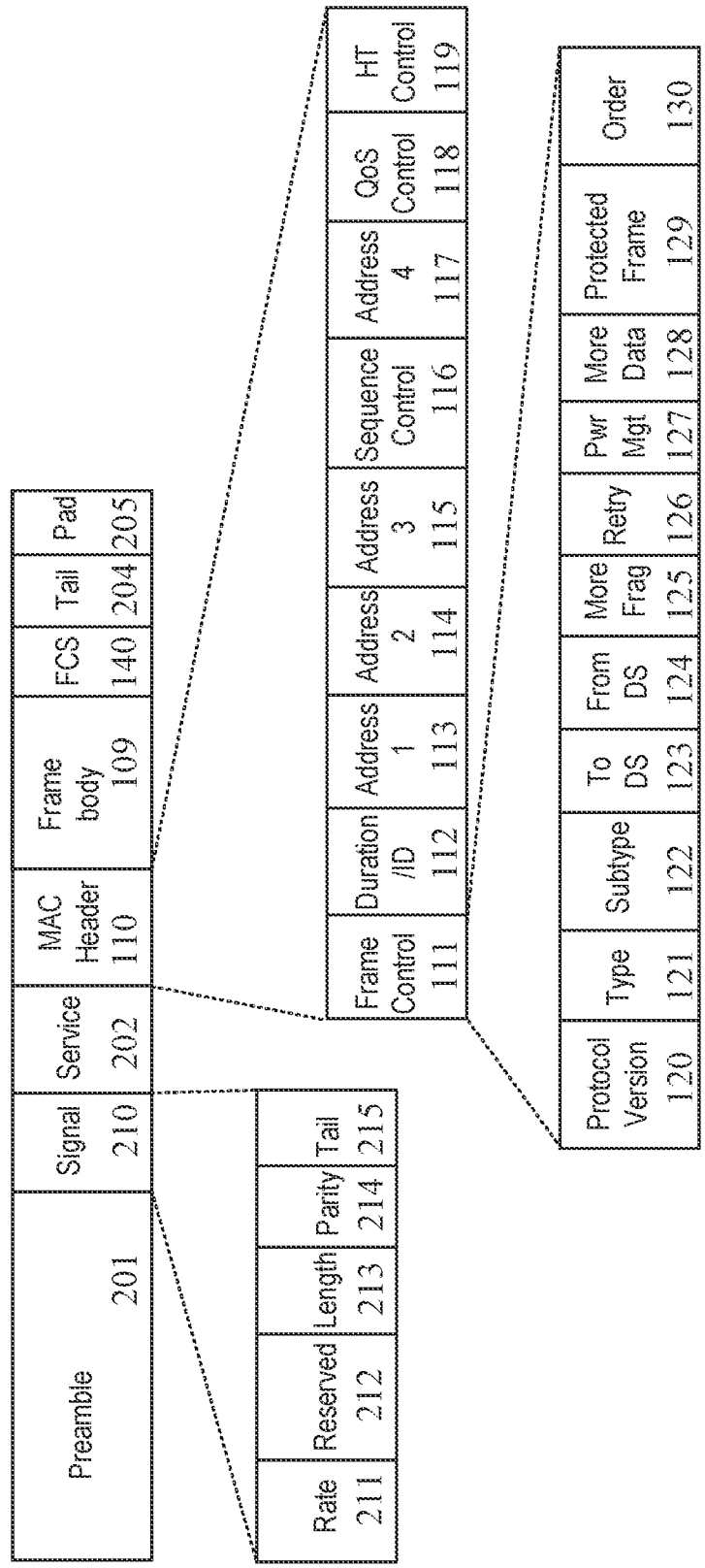
FIG. 2 is a diagram that shows the typical format of an 802.11 OFDM transmitted packet for Clause 17, 18, 19 and 21 devices of the 802.11 Standard commonly known as 11a, 11g, 11n, and 11ac respectively.

With reference to FIGS. 5 to 8, the monitoring station 310 may receive packets transmitted by STA 305 or AP 301 and/or determine attributes of those packets from fields and subfields transmitted up to and including the MAC header 110, as discussed above with reference to FIGS. 1 and 2. Based upon the attributes, monitoring station 310 may decide to send transmission 505 and block the reception of the packet at AP 301 or STA 305 respectively. The attributes that may be determined from reception of the MAC header of packets transmitted by STA 305 or AP 301 may include:
  packet length in time and bits, derived either from the signal 105 and length 107 fields or calculated from the rate 211 and length 213 fields,
  packet description, derived from type 121 and subtype 122 fields,
  intended recipient, from address 1 113.

For example, monitoring station 310 may be configured to send transmission 505 only when the packet 401 is a data packet, sent by STA 305 and addressed to the AP 301, i.e., do not send transmission 505 if the packet is of type management or control. Furthermore, by examination of the number of bits in the data packet, it may be possible to further determine if the data packet likely contains video or audio data. Thus, in one nonlimiting example, the monitoring station 310 may be configured to send (e.g., only send) transmission 505 if the packet 401 is determined to be a packet containing video data. In another nonlimiting example, the monitoring station 310 may be configured to send transmission 505 if the packet 401 is any data packet. Hence, monitoring station 310 may detect data packets from STA 305, send the ACK 405 each time, then also send an ACK 705 transmission, with the result that AP 301 does not send any retries. All control and management packets between AP 301 and STA 305 are therefore unaffected. Hence, there is little possibility (or no possibility) that wireless devices AP 301 or STA 305, or the user of the network, will be aware of the selective packet blocking. For example, if STA 305 has video capability, all video packets sent by the STA 305 may be blocked whilst the other data, control and management of the network appears to be unaffected.

Figure 9:
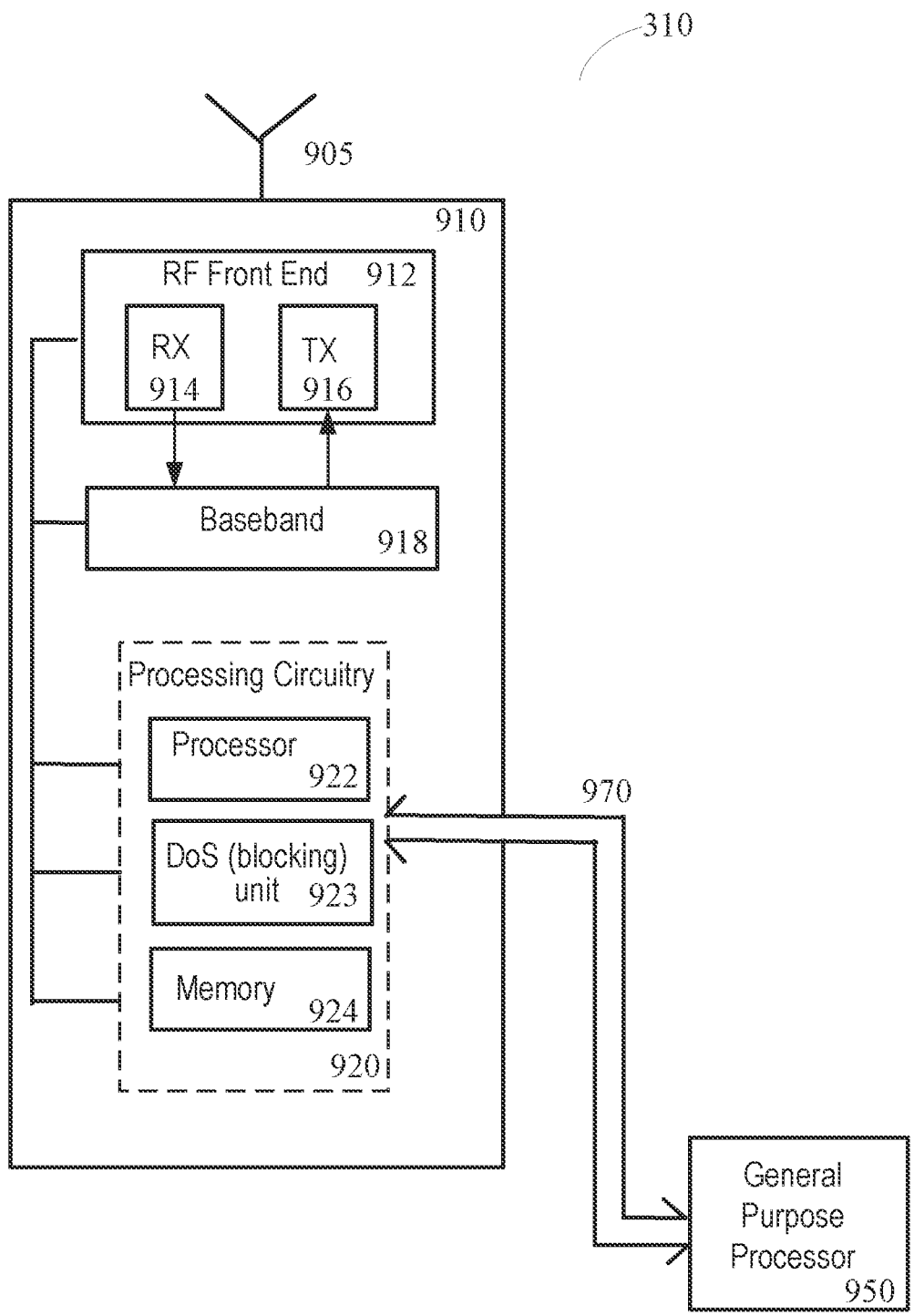
FIG. 9 illustrates a block diagram of an example monitoring station according to the principles of the present disclosure.

FIG. 9 illustrates a block diagram of an example monitoring station 310. The monitoring station 310 may be a device capable of wirelessly receiving signals and transmitting signals and may be configured to execute any of the methods described in the present disclosure and/or the methods of the Standard. Monitoring station 310 may be one or more stations or access points, and the like. The embodiment described herein is that where the monitoring station 310 includes one or more antennas 905, a wireless transmitter receiver 910, and a general purpose processor 950 which is interconnected to the wireless transmitter receiver 910 by a data bus 970.

In some embodiments, the monitoring station 310 includes one or more antennas 905, radio frequency (RF) front end 912 that includes wireless receiver 914 and wireless transmitter 916, baseband 918, and processing circuitry 920 that includes processor 922, DoS (blocking) unit 923, and memory 924. In some embodiments one or more antennas 905 are connected to wireless transmitter 916 and wireless receiver 914. The wireless transmitter 916 may perform the functions of a transmitter front end such as up conversion, filtering and amplification of modulated signals inputted from the baseband 918 suitable for transmission via antenna 905. Wireless receiver 914 may perform the functions of a receiver front end such as low noise amplification, filtering and frequency down conversion, suitable for inputting to baseband 918. Baseband 918 may perform the functions of a baseband such as bit ordering, scrambling, and modulation suitable for inputting to wireless transmitter 916, and de-modulation, de-scrambling and de-coding of the signal received from wireless receiver 914. RF front end 912 (and/or wireless receiver 914 and/or wireless transmitter 916) may be referred to as a transceiver.

Processing circuitry 920 may include DoS (blocking) unit 923. DoS (blocking) unit (along with other hardware elements of monitoring station 310) may be configured to perform any of the methods and/or steps and/or tasks and/or functions and/or processes described in the present disclosure, such as described below with respect to FIGS. 10-12, e.g., DoS/blocking functions, determining and/or transmitting a blocking signal when the received packet meets the at least one criterion of the one packet that is to be blocked, where the blocking signal causes an interference with a reception, at the second wireless device, of at least one field of the received packet.

In some embodiments, the processing circuitry 920 and/or the processor 922 may comprise integrated circuitry for processing and/or control, e.g., one or more processors and/or processor cores and/or FPGAs (Field Programmable Gate Array) and/or ASICs (Application Specific Integrated Circuitry) configured to execute programmatic software instructions. In some embodiments, some functions of the baseband 918 may be performed by the processing circuitry 920. The processing circuitry 920 may be configured to control any of the methods and/or processes described herein and/or to cause such methods, and/or processes to be performed, e.g., by the baseband 918, wireless transmitter 916 and wireless receiver 914. The memory 924 may be configured to store data, programmatic software code and/or other information described herein. In some embodiments, the software may include instructions that, when executed by the processing circuitry 920, causes the processing circuitry 920 to perform the processes described herein with respect to the baseband 918, wireless transmitter 916 and wireless receiver 914.

According to this embodiment of the disclosure, the monitoring station 310 is arranged to receive input signals and the processing circuitry 920 is arranged to measure and monitor input signal attributes, including but not limited to the preamble 101 or 201, header 102 or signal 210, and MAC header 110, e.g., according to the IEEE 802.11 standard. Also, the monitoring station 310 is arranged to receive input signals and the processing circuitry 920 is arranged to measure and monitor an input signal's attributes, including data, management and control packets transmitted by an access point or station that is based upon the IEEE 802.11 standard. Memory 924 may store instructions for executing any method mentioned in the present disclosure, input signals, and results of processing of the processor 922, signals to be outputted and the like.

According to an embodiment of the disclosure, the monitoring station 310 is arranged to transmit signals, and/or the processing circuitry 920 is arranged to prepare the transmitted signal attributes, e.g., based upon the IEEE 802.11 standard. Such transmitted packets may include control packets based upon the IEEE 802.11 standard. Such control packets include ACK packets. Memory 924 may store instructions for executing any method mentioned in the present disclosure, input signals, and results of processing of the processor 922, signals to be outputted and the like.

According to an embodiment of the disclosure, the monitoring station 310 is arranged to receive transmissions of another wireless communication device and, together with the processing circuitry 920, is arranged to monitor attributes of the received transmissions of the other wireless communication device, and determine the attributes of the preamble 101 or 201, header 102, signal 210 and MAC header 110. In addition, according to an embodiment of the disclosure, the monitoring station 310 is arranged to measure the time of arrival of the received transmissions of the other wireless device. In addition, according to an embodiment of the disclosure, the monitoring station 310 is arranged to measure the specific times of the reception of the MAC header of transmissions from another wireless communication device. Processor 922 together with memory 924 may process the information within the preamble 101 or 201, header 102, signal 210 and MAC header 110 so as to determine the attributes of the received packet.

According to an embodiment of the disclosure, the monitoring station 310 may be arranged to transmit packets to another wireless communication device and the processing circuitry 920 (and/or DoS (blocking) unit 923) may be arranged to prepare the attributes of the packet to be transmitted.

According to an embodiment of the disclosure, general purpose processor 950 may be used to control the operations of the monitoring station 310 and in particular the wireless transmitter receiver 910 via data bus 970. General purpose processor 950 may also carry out the various calculations as described in this disclosure and may also be used to input various instructions related to the attributes that are to be monitored.

Note that the modules discussed herein may be implemented in hardware or a combination of hardware and software. For example, the modules may be implemented by a processor executing software instructions or by application specific integrated circuitry configured to implement the functions attributable to the modules. Also note that the term "connected to" as used herein refers to "being in communication with" and is not intended to mean a physical connection nor a direct connection. It is contemplated that the signal path between one element and another may traverse multiple physical devices.

Thus, in some embodiments, the processing circuitry 920 may include the memory 924 and a processor 922, and DoS (blocking) unit 923, the memory 924 containing instructions which, when executed by the processor 922 and/or DoS (blocking) unit 923, configure the processor 922 and/or DoS (blocking) unit 923 to perform the one or more functions described herein. In addition to a traditional processor and memory, the processing circuitry 920 may comprise integrated circuitry for processing and/or control, e.g., one or more processors and/or processor cores and/or FPGAs (Field Programmable Gate Array) and/or ASICs (Application Specific Integrated Circuitry).

The processing circuitry 920 and/or DoS (blocking) unit 923 may include and/or be connected to and/or be configured for accessing (e.g., writing to and/or reading from) the memory 924, which may include any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 924 may be configured to store code executable by control circuitry and/or other data, e.g., data pertaining to communication, e.g., configuration and/or address data of nodes, etc. The processing circuitry 920 may be configured to control any of the methods described herein and/or to cause such methods to be performed, e.g., by the processor 922 and/or DoS (blocking) unit 923. Corresponding instructions may be stored in the memory 924, which may be readable and/or readably connected to the processing circuitry 920. In other words, the processing circuitry 920 may include a controller, which may comprise a microprocessor and/or microcontroller and/or FPGA (Field-Programmable Gate Array) device and/or ASIC (Application Specific Integrated Circuit) device. It may be considered that the processing circuitry 920 includes or may be connected or connectable to memory, which may be configured to be accessible for reading and/or writing by the controller and/or processing circuitry 920. It is also noted that the elements of the monitoring station 310 can be included in a single physical device/housing or can be distributed among several different physical devices/housings.

Figure 10:
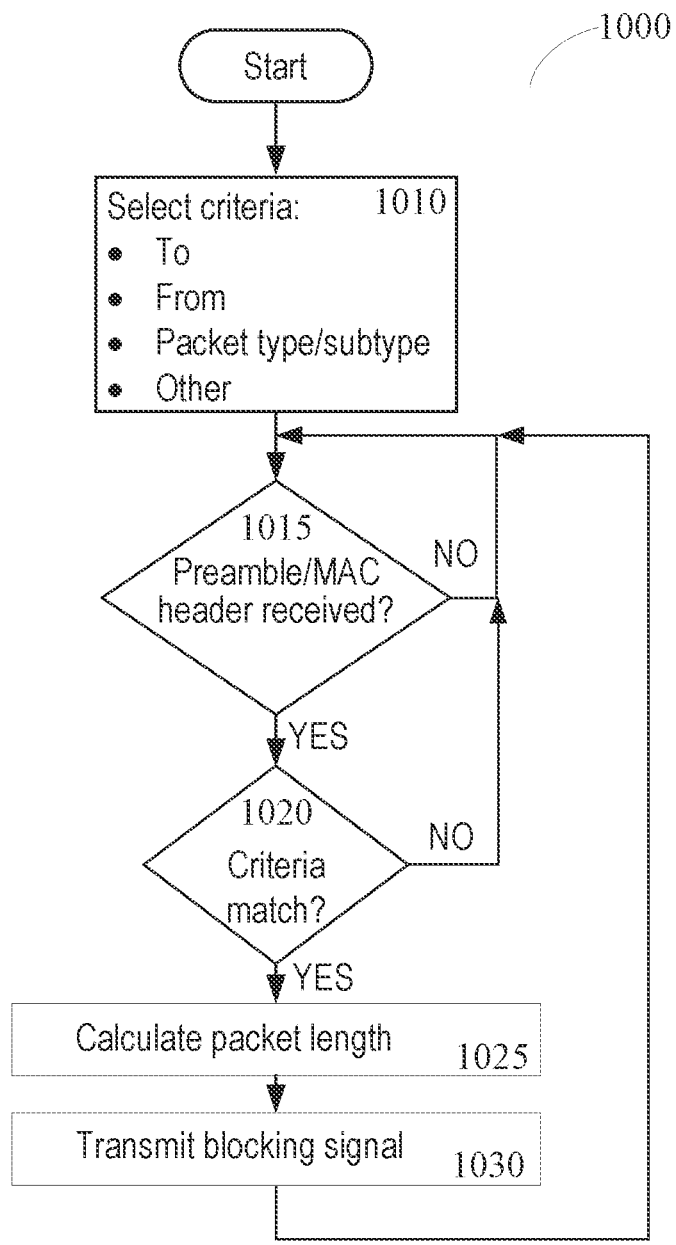
FIG. 10 is a flowchart of an example of a method for identifying a packet and transmitting a blocking signal according to the principles of the present disclosure.

FIG. 10 is a flowchart of an example of a method 1000 for identifying a packet and transmitting a blocking signal. Method 1000 may start at step 1010 where packet criteria may be entered. Such criteria may include Address 1 113, Address 2 114, type, 121, subtype 122. The criteria and details may be selected by a user through the general purpose processor 950 and inputted to the processing circuitry 920. The user may also enter criteria relating to the packet length. At step 1015, it is determined if the preamble 101 or 201 to a packet, 401 or 601, has been received and if the MAC header 110 has also been received. The baseband 918 may determine if a valid packet preamble 101 or 201, and MAC header 110 have been received from the wireless receiver 914. If a MAC header 110 has been received, then if the fields/subfields corresponding to the inputted criteria, in step 1010, match, then at step 1025 the packet length may be determined. The packet length is the length of the packet after the MAC header and may be determined from the signal 105 and length 107 fields, for DSSS and ER/DSSS packets, or from the rate 211 and length 213 fields for OFDM packets, as described in the Standard. If, at step 1020, the criteria do not match the fields corresponding to the inputted criteria, in step 1010, then the method returns to step 1015. The matching of the criteria and the determination of the packet length may be performed by the processing circuitry 920.

At step 1030, as discussed above with reference to FIGS. 5 and 6, transmission 505 or 605 may then take place. With reference to FIGS. 5 and 6, the MAC header is received at time t2 412 or t12 612. At step 1025, the time, t3 413 or t13 613, to the end of the received packet may be determined. Transmission 505 or 605 may start at time t6 512 or t16 620, and hence in order to not exceed the time, t3 413 or t13 613, where the received packet 401 or 601 ends, the maximum time that the transmission 505 or 605 may continue may, in step 1025, be calculated. As discussed above with reference to FIGS. 5 and 6, transmissions 505 or 605 may interfere with the reception of the frame body 109 and, dependent upon the duration of the transmission 505 or 605, the FCS 140. The result is that the received packet 401 or 601 will contain errors and at the receiving device, AP 301 or STA 305, the FCS 140 check will fail, and the packet will be abandoned. After step 1110, the method returns to step 1015 to await a new packet. The determination and control of the length of the transmission 505 or 605 is carried out in the processing circuitry 920 controlling the baseband 918 and wireless transmitter 916.

Figure 11:
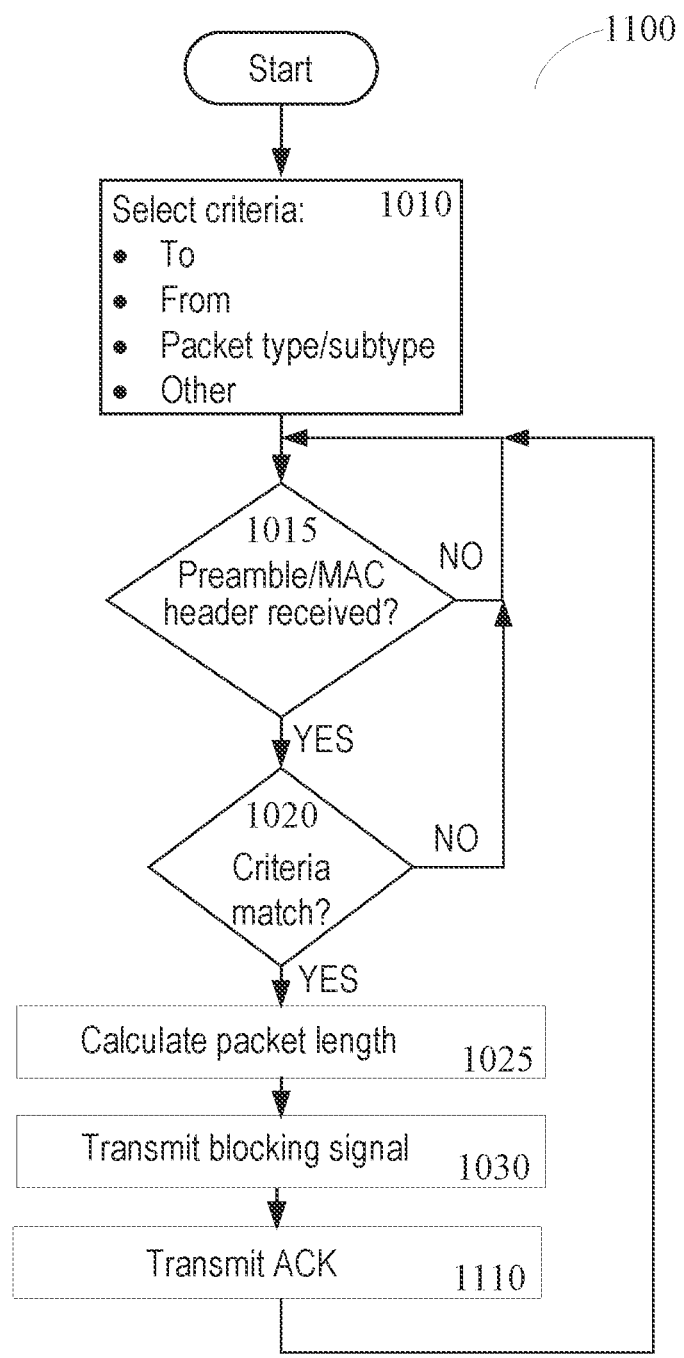
FIG. 11 is a flowchart of another example of a method for identifying a packet and transmitting a blocking signal, identical to the method described in FIG. 10, but with the addition of the transmission of an ACK packet according to the principles of the present disclosure.

FIG. 11 is a flowchart of another example of a method 1100 for identifying a packet and transmitting a blocking signal identical to the method described in FIG. 10, but with the addition of the transmission of an ACK packet, 705 or 805, as discussed above with reference to FIGS. 7 and 8 respectively. Method 1100 refers to the cases where the received packet 401 or 601 is of a type that if received correctly would cause an ACK to be sent. The steps in method 1100 are identical to method 1000 described in FIG. 10, with an additional step 1110, that is inserted after step 1030. At step 1110, at time t4, 414 or t14 614, nominally SIFS after time t3 413 or t13 613, the monitoring station 310 transmits an ACK 705 or 805, addressed to the sender, STA 305 or AP 301, of packet 401 or 601, respectively.

In step 1010, the criteria(s) of the packet(s) that are of interest, are inputted. In one example STA 305 is a Wi-Fi device with a camera that sends video, possibly triggered by motion detection, via AP 301 to a user display. In order to identify such video data packets, the monitoring station 310 may be set, as per steps 1010 and 1020, to detect packets of type 121 "data" or "QoS data", sent from address 1 113, corresponding to STA 305, to address 2 114, corresponding to AP 301. Packets of subtype "null", or "QoS Null" could be ignored as they do not contain any actual data, i.e., video information. Hence, at step 1030 the transmissions 505 or 605 are sent only for such selected "data" (e.g., video) packets. Then, at step 1110, the ACK packet 705 or 805 may be sent such that STA 305 assumes that its data packet was received correctly at AP 301, and does not send any retries. Because the transmissions 505 and 605 are selective, and also because pseudo ACK packets 705 and 805 are transmitted by the monitoring station 310, there is no disruption of the general traffic of the infrastructure network of AP 301. In addition, there is low possibility (or no possibility) that the network or its user will be alerted that deliberate interference is occurring.

Transmissions 505 and 605, sent by the monitoring station 310, may be used solely to interfere with the frame body of the selected frames transmitted between the STA 305 and AP 301. As such there is no requirement to transfer any information within these transmissions 505 and 605. Hence, there are many formats that may be used as transmissions 505 and 605. Examples of transmissions 505 and 605 may include packets with or without any preamble, random modulated bits, single or variable carrier frequency/frequencies, and pulsed transmissions. The purpose of transmissions 505 and 605 is purely to transmit energy that will cause bit errors in the received packets 401 and 601.

Figure 12:
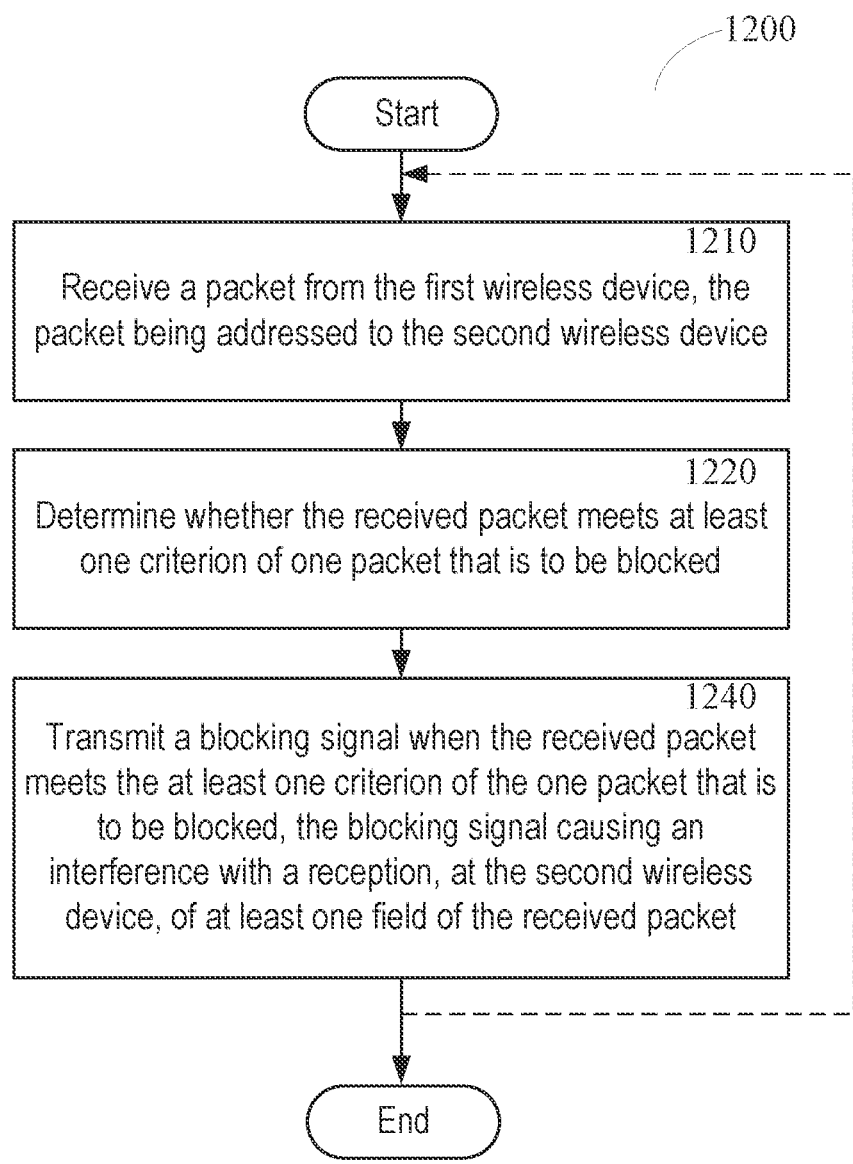
FIG. 12 is a flowchart of one other example of a method implemented in a monitoring station according to the principles of the present disclosure.

FIG. 12 shows an example process (i.e., method) implemented a monitoring station 310 according to some embodiments of the present disclosure. One or more Blocks and/or functions and/or methods performed (e.g., in any particular order and/or in a loop) by monitoring station 310 may be performed by one or more elements of monitoring station 310 such as one or more antennas 905 and/or wireless transmitter receiver 910 and/or RF front end 912 (which may include transceiver such as wireless receiver 914 and/or wireless transmitter 916) and/or baseband 918 and/or processing circuitry 920 (which may include processor 922 and/or DoS (blocking) unit 923 and/or memory 924) and/or general purpose processor 950, etc. according to the example process/method. The example process includes receiving (Block 1210), such as via, antenna 905 and/or RF front end 912 and/or baseband 918 and/or processing circuitry 920, a packet from the first wireless device, the packet being addressed to the second wireless device; determining (Block 1220), such as via processing circuitry 920 and/or DoS (blocking) unit 923 and/or memory 921, whether the received packet meets at least one criterion of one packet that is to be blocked; and transmitting (Block 1240), such as via RF front end 912 and/or processing circuitry 920, a blocking signal when the received packet meets the at least one criterion of the one packet that is to be blocked. The blocking signal causes an interference with a reception, at the second wireless device, of at least one field of the received packet.

In some embodiments, determining whether the received packet meets the at least one criterion of one packet that is to be blocked includes determining whether at least one of a subfield and a field of the received packet matches at least one of one corresponding subfield and one corresponding field of the one packet that is to be blocked, the at least one field up to and including a MAC header.

In some other embodiments, the at least one of the subfield and the field of the received packet includes a value associated with any of a first address, a second address, a type, subtype, length, rate, and a signal.

In one embodiment, the method further includes determining a duration of the received packet based at least in part on the at least one of the subfield and the field of the received packet.

In another embodiment, at least one of the blocking signal is transmitted after a reception of a MAC header of the received packet, and the transmission of the blocking signal is terminated before an end of the received packet.

In some embodiments, the method further includes transmitting, to the first wireless device, an acknowledgement packet associated with the received packet at a time after at least one of the end of the received packet and the termination of the transmission of the blocking signal.

In some other embodiments, the acknowledgement packet is transmitted at a time corresponding to a Short Interframe Space after a determined end of a duration of the received packet.

In one embodiment, the method further includes determining an attribute of the received packet at least in part on at least one of a type and a subtype subfield of a frame control field of the received packet.

In another embodiment, the at least one criterion is met when the determined attribute indicates any one of the received packet is a data packet, and the data packet includes data associated with at least one of video and audio.

In some embodiments, the first wireless device is a first station (e.g., an STA 305), and the second wireless device is a second station (e.g., another STA 305, an AP 301). The first and second stations are configured to communicate with each other using at least one packet that is compliant with Institute of Electrical and Electronics Engineers Standard 802.11.

The following is a list of nonlimiting example embodiments:

1. A method at a monitoring station to identify an intercepted packet and transmit a timed blocking signal, the method comprising:
   receiving a packet from a first wireless device addressed to a second wireless device;
   determining whether at least one criterion of a packet that is to be blocked is met by the received packet; and
   transmitting a blocking signal if it is determined that at least one criterion of a packet that is to be blocked is met by the received packet.

2. The method of Embodiment 1, wherein the received packet is compliant with IEEE 802.11.

3. The method of Embodiment 2, wherein the at least one criterion are fields and subfields in the received packet, up to and including the MAC header.

4. The method of Embodiment 2, wherein the at least one criterion includes values contained in one or more of the following fields/subfields: address 1, address 2, type, subtype, length, rate, signal.

5. The method of Embodiment 2, further comprising determining the duration of the received packet based upon the values of the length, signal and rate fields/subfields.

6. The method of Embodiment 2, wherein the monitoring station transmits a blocking signal that starts after reception of the MAC header and terminates before the end of the received packet 7. The method of Embodiment 2, wherein the blocking signal is a random bit stream.

8. The method of Embodiment 2, further comprising the transmission of an ACK packet at a time SIFS after the end of the received packet.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD ROMs, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (which when programmed as described herein forms a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

While the above description contains many specifics, these should not be construed as limitations on the scope, but rather as an exemplification of several embodiments thereof. Many other variants are possible including, for examples: specific packet attributes, details of the format of the blocking transmissions 505 and 605, length and timing of the blocking transmissions 505 and 605, decision on when to send the pseudo ACK 705 and 805. Accordingly, the scope should be determined not only by the embodiments illustrated.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method implemented in a monitoring station configurable to monitor a communication between a first wireless device and a second wireless device, the method comprising:
    receiving a packet from the first wireless device, the packet being addressed to the second wireless device;
    determining whether the received packet meets at least one criterion of one packet that is to be blocked; and
    transmitting a blocking signal when the received packet meets the at least one criterion of the one packet that is to be blocked, the blocking signal causing:
        an interference with a reception, at the second wireless device, of at least one field of the received packet;
        the second wireless device to determine that the packet has not been successfully received at the second wireless device based on the interference with the reception of the at least one field;
        the second wireless device to avoid transmitting a first acknowledgement packet, in response to determining that the packet has not been successfully received at the second wireless device; and
    transmitting, from the monitoring station to the first wireless device, a second acknowledgement packet including information indicating a successful reception of the packet by the second wireless device, the second acknowledgement packet being transmitted at a time after the termination of the transmission of the blocking signal, the transmitted second acknowledgement packet triggering the first wireless device to determine that the packet was successfully received by the second wireless device and to avoid re-transmission of the packet.

2. The method of claim 1, wherein determining whether the received packet meets the at least one criterion of one packet that is to be blocked includes:
    determining whether at least one of a subfield and a field of the received packet matches at least one of one corresponding subfield and one corresponding field of the one packet that is to be blocked, the at least one field up to and including a MAC header.

3. The method of claim 2, wherein the at least one of the subfield and the field of the received packet includes a value associated with any of a first address, a second address, a type, subtype, length, rate, and a signal.

4. The method of claim 2, wherein the method further includes:
    determining a duration of the received packet based at least in part on the at least one of the subfield and the field of the received packet.

5. The method of claim 1, wherein at least one of the blocking signal is transmitted after a reception of a MAC header of the received packet, and the transmission of the blocking signal is terminated before an end of the received packet.

6. The method of claim 5, wherein the method further includes:
    transmitting, from the monitoring station to the first wireless device, the second acknowledgement packet at the time after the end of the received packet.

7. The method of claim 6, wherein the second acknowledgement packet is transmitted at a time corresponding to a Short Interframe Space after a determined end of a duration of the received packet.

8. The method of claim 1, wherein the method further includes:
    determining an attribute of the received packet at least in part on at least one of a type and a subtype subfield of a frame control field of the received packet.

9. The method of claim 8, wherein the at least one criterion is met when the determined attribute indicates any one of the received packet is a data packet, and the data packet includes data associated with at least one of video and audio.

10. The method of claim 1, wherein the first wireless device is a first station, and the second wireless device is a second station, the first and second stations being configured to communicate with each other using at least one packet that is compliant with Institute of Electrical and Electronics Engineers Standard 802.11.

11. A monitoring station configurable to monitor a communication between a first wireless device and a second wireless device, the monitoring station comprising:
    a transceiver configured to:
        receive a packet from the first wireless device, the packet being addressed to the second wireless device;
        transmit a blocking signal when the received packet meets at least one criterion of one packet that is to be blocked, the blocking signal causing:
            an interference with a reception, at the second wireless device, of at least one field of the received packet;
            the second wireless device to determine that the packet has not been successfully received at the second wireless device based on the interference with the reception of the at least one field;
            the second wireless device to avoid transmitting a first acknowledgement packet, in response to determining that the packet has not been successfully received at the second wireless device;
        transmit, from the monitoring station to the first wireless device, a second acknowledgement packet including information indicating a successful reception of the packet by the second wireless device, the second acknowledgement packet being transmitted at a time after the termination of the transmission of the blocking signal, the transmitted second acknowledgement packet triggering the first wireless device to determine that the packet was successfully received by the second wireless device and to avoid re-transmission of the packet; and processing circuitry in communication with the transceiver, the processing circuitry being configured to:
 determine whether the received packet meets the at least one criterion of the one packet that is to be blocked.

12. The monitoring station of claim 11, wherein determining whether the received packet meets the at least one criterion of one packet that is to be blocked includes:
 determining whether at least one of a subfield and a field of the received packet matches at least one of one corresponding subfield and one corresponding field of the one packet that is to be blocked, the at least one field up to and including a MAC header.

13. The monitoring station of claim 12, wherein the at least one of the subfield and the field of the received packet includes a value associated with any of a first address, a second address, a type, subtype, length, rate, and a signal.

14. The monitoring station of claim 12, wherein the processing circuitry is further configured to:
 determine a duration of the received packet based at least in part on the at least one of the subfield and the field of the received packet.

15. The monitoring station of claim 11, wherein at least one of the blocking signal is transmitted after a reception of a MAC header of the received packet, and the transmission of the blocking signal is terminated before an end of the received packet.

16. The monitoring station of claim 15, wherein the transceiver is further configured to:
 transmit, from the monitoring station to the first wireless device, the second acknowledgement packet at the time after the end of the received packet.

17. The monitoring station of claim 16, wherein the second acknowledgement packet is transmitted at a time corresponding to a Short Interframe Space after a determined end of a duration of the received packet.

18. The monitoring station of claim 11, wherein the processing circuitry is further configured to:
 determine an attribute of the received packet at least in part on at least one of a type and a subtype subfield of a frame control field of the received packet.

19. The monitoring station of claim 18, wherein the at least one criterion is met when the determined attribute indicates any one of the received packet is a data packet, and the data packet includes data associated with at least one of video and audio.

20. A monitoring system configurable to monitor a communication between a first wireless device and a second wireless device, the monitoring system comprising:
 a transceiver configured to:
  receive a packet from the first wireless device, the packet being addressed to the second wireless device;
  transmit a blocking signal when the received packet meets at least one criterion of one packet that is to be blocked, the blocking signal causing:
   an interference with a reception, at the second wireless device, of at least one field of the received packet;
   the second wireless device to determine that the packet has not been successfully received at the second wireless device based on the interference with the reception of the at least one field;
   the second wireless device to avoid transmitting a first acknowledgement packet, in response to determining that the packet has not been successfully received at the second wireless device;
  transmit, from the monitoring station to the first wireless device, a second acknowledgement packet including information indicating a successful reception of the packet by the second wireless device, the second acknowledgement packet being transmitted at a time after the termination of the transmission of the blocking signal, the transmitted second acknowledgement packet triggering the first wireless device to determine that the packet was successfully received by the second wireless device and to avoid re-transmission of the packet; and
 processing circuitry in communication with the transceiver, the processing circuitry being configured to:
  determine an attribute of the received packet at least in part on at least one of a type and a subtype subfield of a frame control field of the received packet; and
  determine whether the received packet meets the at least one criterion of the one packet that is to be blocked, the at least one criterion being met when the determined attribute indicates the received packet is a data packet.

* * * * *